(12) United States Patent
Villa

(10) Patent No.: US 11,517,031 B2
(45) Date of Patent: Dec. 6, 2022

(54) RAPID METHOD OF PRODUCING NON-ALCOHOLIC AND ALCOHOLIC BEER

(71) Applicant: CERIA, Inc., Arvada, CO (US)

(72) Inventor: Keith Villa, Arvada, CO (US)

(73) Assignee: CERIA, Inc., Arvada, CO (US)

(*) Notice: Subject to any disclaimer, the term of this patent is extended or adjusted under 35 U.S.C. 154(b) by 0 days.

(21) Appl. No.: 17/733,987

(22) Filed: Apr. 29, 2022

(65) Prior Publication Data

US 2022/0256893 A1 Aug. 18, 2022

Related U.S. Application Data

(63) Continuation-in-part of application No. PCT/US2022/014634, filed on Jan. 31, 2022.

(60) Provisional application No. 63/333,464, filed on Apr. 21, 2022, provisional application No. 63/143,938, filed on Jan. 31, 2021.

(51) Int. Cl.
| | |
|---|---|
| *A23L 2/38* | (2021.01) |
| *C12H 6/00* | (2019.01) |
| *A23L 2/60* | (2006.01) |
| *A23L 2/56* | (2006.01) |

(52) U.S. Cl.
CPC ............ *A23L 2/382* (2013.01); *A23L 2/56* (2013.01); *A23L 2/60* (2013.01); *C12H 6/00* (2019.02)

(58) Field of Classification Search
CPC ... A23L 2/382; A23L 2/56; A23L 2/60; C12H 6/00
USPC .................... 426/590, 592, 600, 650, 520
See application file for complete search history.

(56) References Cited

U.S. PATENT DOCUMENTS

| | | |
|---|---|---|
| 878,790 A * | 2/1908 | Freund |
| 2015/0030749 A1* | 1/2015 | Kosugi et al. |
| 2016/0108448 A1 | 4/2016 | Ge et al. |
| 2017/0360067 A1 | 12/2017 | Golan |
| 2018/0135000 A1 | 5/2018 | Methner et al. |
| 2018/0208882 A1 | 7/2018 | Ishihara et al. |
| 2020/0190449 A1 | 6/2020 | Hakim |

FOREIGN PATENT DOCUMENTS

WO WO 2016/044377 3/2016

OTHER PUBLICATIONS

Galante S. "Oatmeal Stout ("brew your own")", pp. 1-11, https://byo.com/article/oatmeal-stout-style. (Year: 1997).*
International Search Report and Written Opinion for PCT/US22/14634 dated Apr. 12, 2022, 10 pages.

* cited by examiner

*Primary Examiner* — Helen F Heggestad
(74) *Attorney, Agent, or Firm* — Adsero IP

(57) ABSTRACT

A rapid method of brewing malt beverages having 0.0% alcohol by volume with the use of yeast in aerobic conditions. The yeast is inactivated by boiling after undergoing fermentative (minimal yeast contact time) growth, during either aerobic or anaerobic conditions. Aspects of the beverage such as sweetness, aldehyde content, flavor-positive components, pH, mouthfeel and heat are controlled to emulate popular styles of beer. The beverage may also be fortified with alcohol to create alcoholic products, such as beer, kombucha, hard seltzer, wine or spirits in a rapid time frame.

20 Claims, 5 Drawing Sheets

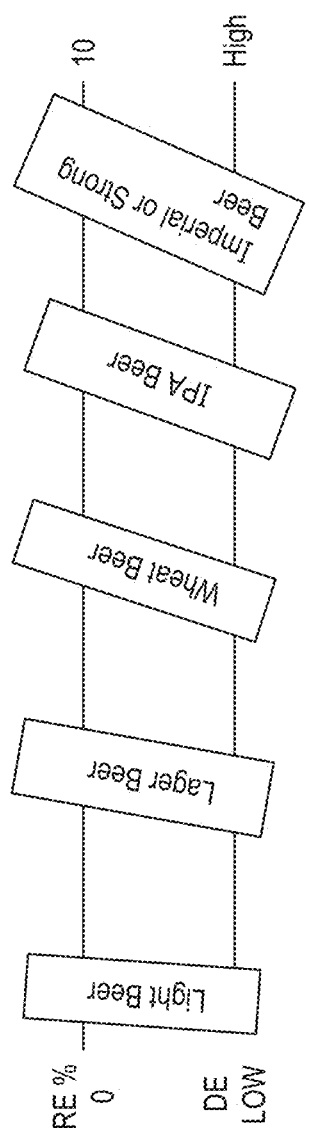

Method

*Faster Method Using a Liquid or Dry Malt Extract Mashing*

*Using Ultra-High Temperature Mashing in Lieu of a Malt Extract*

**Malt Extract + Additives* +Water + Yeast**

Mixed, Aerated for 4 hours at 31 degrees C

↓

Malt + Water + Yeast

Mix malt and water. Hold at 80 degrees C for 30 minutes. Cool to 31 degrees C. Add yeast and additives*, and aerate for 4 hours at 31 degrees C

↓

Add Malt Extract/Additives*/Water/Yeast to MaltoDextrin/Water/Lactic Acid, targeting the range of RE % w/w and DE for the desired style Add Lactic Acid to Malt/Water/Yeast/Additives*

↓

Other specialty ingredients can be added at this point, such as hops, spices, herbs, specialty malts, to "Finish" the beer into the desired style

↓

Pre-boil alcohol check:
typically 0.01% - 0.2% ABV
Increase temperature to boiling and boil for 60 minutes. Peptide solution, such as soy sauce, can be added during the last 10 minutes of boil, if desired Post-boil alcohol check:
should be 0.00% ABV
Boil time is extended, if needed, to lower ABV to 0.00%

↓

Product is cooled, and filtered if desired. Other specialty ingredients can be added at this point to "Finish" the beer into the desired style, such as dry hopping to make an IPA, or flavorings such as fruits or spices or natural or artificial flavorings.

↓

Addition of alcohol, powdered alcohol or alcohol-containing product to create a final product with alcohol, if desired.

Addition of caffeine, vitamin supplements, mineral supplements, kombucha, herbs, teas, spices, terpenes, cannabinoids, or other materials, if desired

↓

Product is carbonated to desired amount (vol/vol) of $CO_2$ and then packaged and pasteurized.

*with or without hops, flavor-active materials such as spices, psychoactive materials and/or physiologically active materials

FIG. 3

RAPID METHOD OF PRODUCING NON-ALCOHOLIC AND ALCOHOLIC BEER

CROSS REFERENCE TO RELATED APPLICATIONS

This application is a continuation in part of PCT/US22/14634, entitled "RAPID METHOD OF PRODUCING NON-ALCOHOLIC AND ALCOHOLIC BEER", filed Jan. 31, 2022. This application claims priority to U.S. provisional application Ser. No. 63/333,464 entitled "RAPID METHOD OF PRODUCING NON-ALCOHOLIC AND ALCOHOLIC BEER", filed Apr. 21, 2022, and U.S. provisional application Ser. No. 63/143,938 entitled "METHOD OF PRODUCING NON-ALCOHOLIC BEER," filed Jan. 31, 2021, the entire disclosures of which are hereby incorporated by reference. Any disclaimer that may have occurred during the prosecution of the above-referenced applications is hereby expressly rescinded, and reconsideration of all relevant art is respectfully requested.

FIELD OF THE INVENTION

The present invention is directed to a rapid method of producing a malt beverage containing 0% alcohol by volume, different than the currently available malt beverages containing up to 0.5% alcohol by volume. The beverage may be fortified with alcohol to create alcoholic products in a rapid time frame.

BACKGROUND OF THE INVENTION

There is currently a widespread consumer interest in non-alcoholic malt beverages, including beer-taste beverages. These "non-alcoholic" beverages typically have some residual alcohol, generally less than 0.5% alcohol by volume (ABV).

Traditional alcohol containing malt beverages are produced whereby yeast converts the glucose in a malt extract (wort), into ethyl alcohol and carbon dioxide gas ($CO_2$), resulting in the alcohol content and carbonation. The fermentation process starts when cooled wort is transferred to a fermenting vessel and yeast is added. This occurs in an anaerobic environment and takes two to six weeks to produce the final product.

Some non-alcoholic beverages currently available are produced by suppressing the fermentation process, thereby reducing the amount of alcohol produced yet still retaining malt flavors produced during the fermentation process.

Other non-alcoholic beverages are produced by removing alcohol from the final product, or eliminating the fermentation step entirely. Malt flavors can be provided by other means.

Presently disclosed is a method to include malt and yeast flavors by combining malt extract (wort), with or without hops, flavor-active materials such as spices, psychoactive materials, and/or physiologically active materials; and yeast in an aerobic environment, followed by heating to remove residual alcohol by evaporation.

BRIEF DESCRIPTION OF THE DRAWINGS

FIG. 2 shows the optimal RE:DE target for simulating malt beverage body profiles. RE % (Real Extract % weight/weight) increases in heavier beer types, while DE (Dextrose equivalent or sweetness) increases to a lesser extent. A balance between RE and DE is critical to achieve the desired beer taste.

FIG. 3 shows a comparison of methods.

SUMMARY OF THE INVENTION

Figure 1:
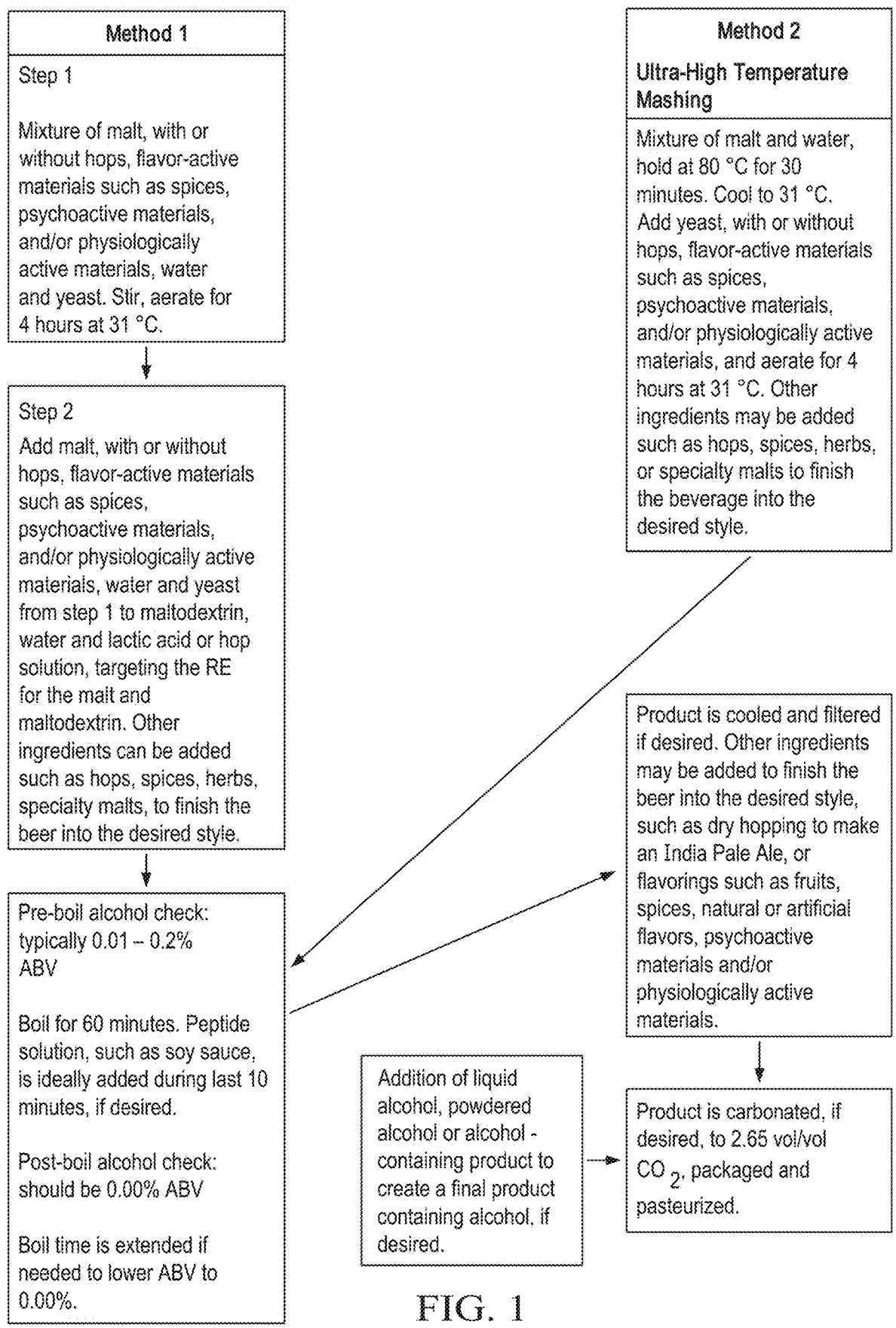
FIG. 1 shows a flow chart of a method for fast production of a malt beverage containing 0% alcohol by volume, and an alternative method showing an ultra high temperature mashing method for producing a malt beverage containing 0% alcohol by volume.
Figure 4:
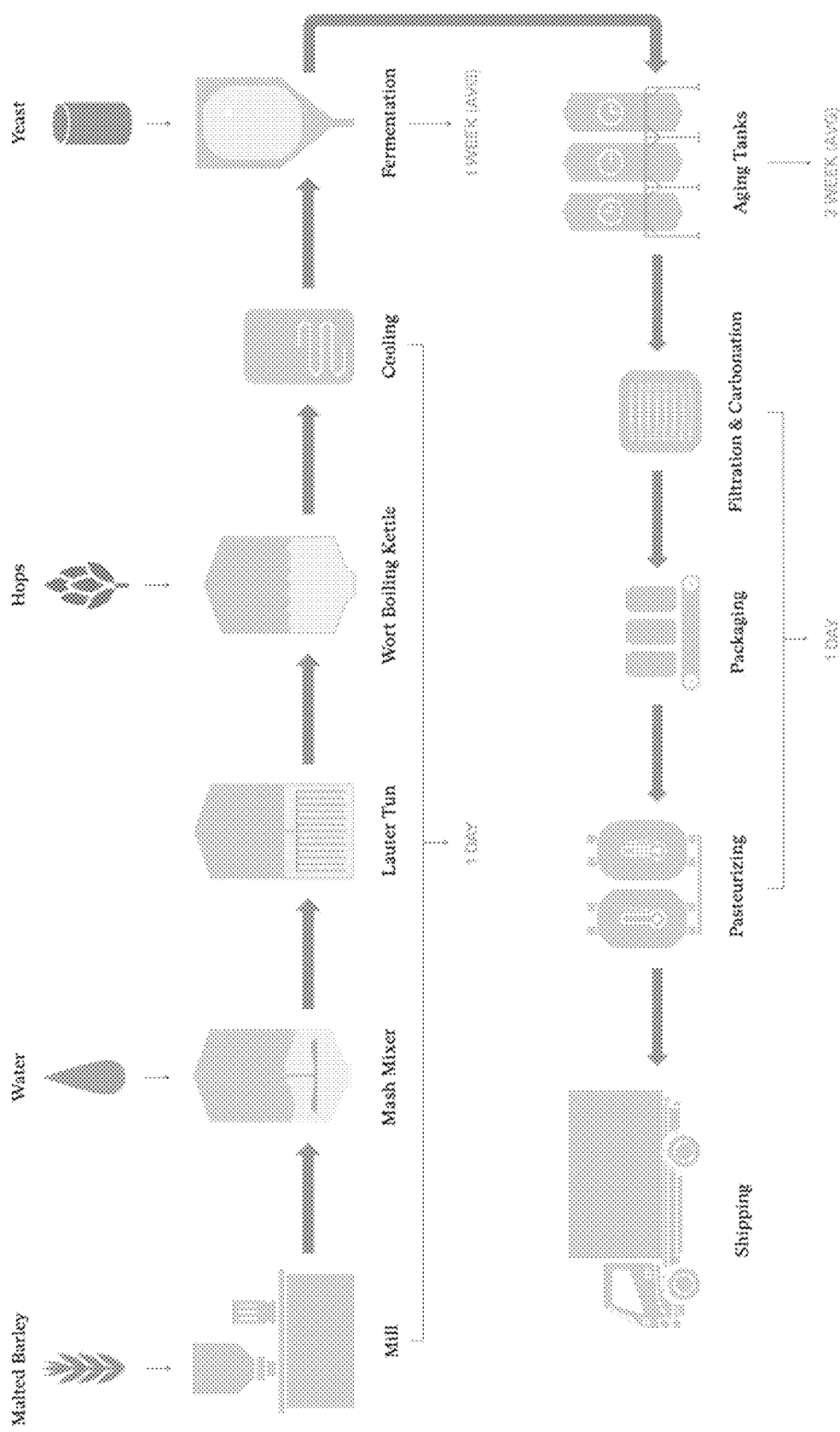
FIG. 4 shows a diagram of a traditional brewing method that takes two to six weeks.
Figure 5:
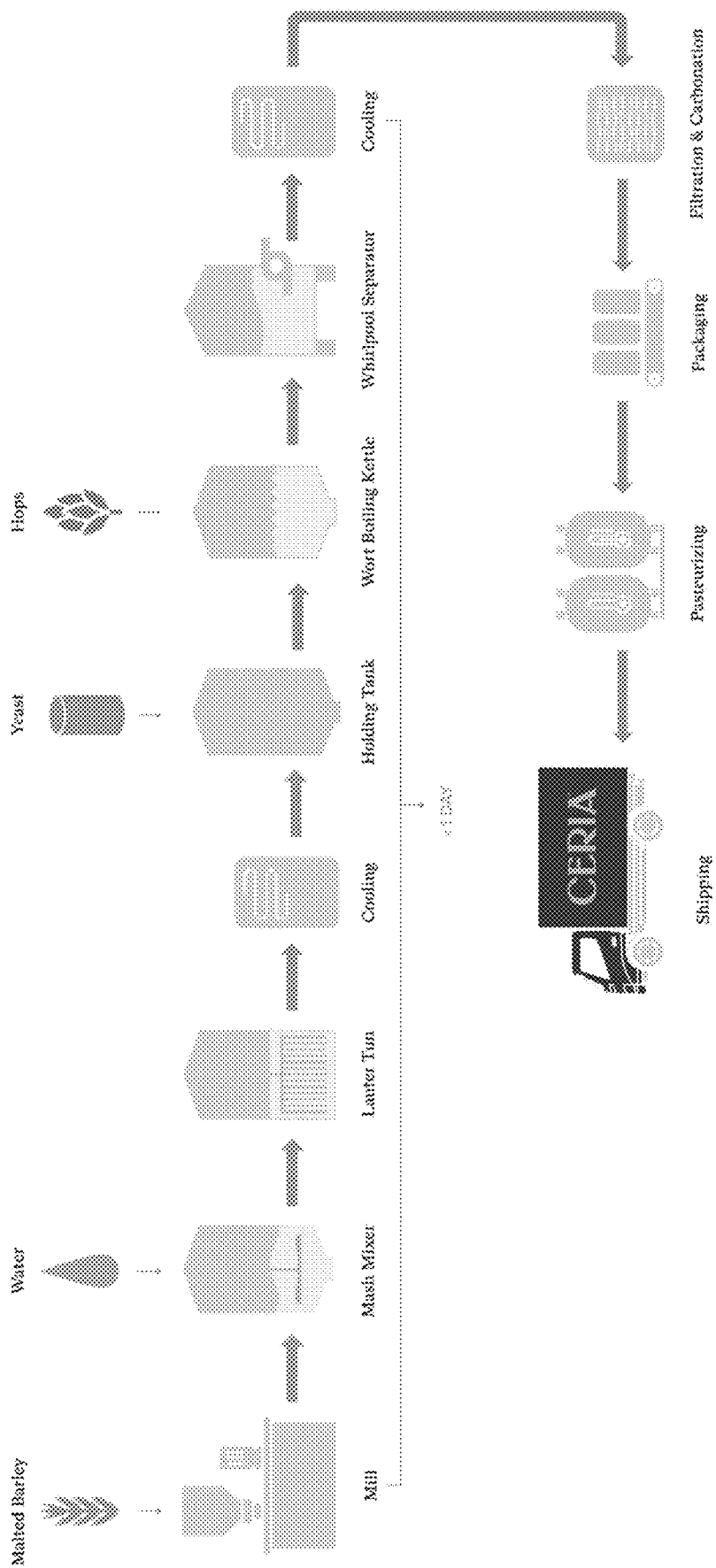
FIG. 5 shows a diagram of a one-day brewing method.

Traditionally, the flavors of many malt flavored beer-type beverages originate during alcoholic fermentation of the brewing ingredients by the introduction of yeast. Provided is a partially fermented malt beverage (made with minimal yeast contact time), where the flavor components are provided by malts, with or without hops, flavor-active materials such as spices, psychoactive materials, and/or physiologically active materials; yeast, and the addition of other flavor components, resulting in a beverage with 0% ABV as measured by an Anton-Paar instrument or other industry standard as would be known by one with skill in the art.

In one embodiment is a method for producing a partially fermented malt beverage (made with minimal yeast contact time), comprising the steps of constructing the base, consisting of malt extract, with or without hops, flavor-active materials such as spices, psychoactive materials, and/or physiologically active materials; yeast and water, under aerobic conditions. The growth of yeast produces compounds, such as esters, associated with the desired flavor of beer while metabolizing and/or removing aldehyde compounds. Controlling the acidity of the mixture is done by the addition of a food-grade acid. Controlling the "mouthfeel" of the product is done by boiling the malt/yeast/hops mixture (which releases peptides), and finally adding a small amount of warming agent to simulate the physiological effect of alcohol during consumption. An example of a warming agent is isothiocyanate which can be added in synthetic form or by adding plants that contain isothiocyanate.

In one embodiment is a method for producing a partially fermented malt beverage (made with minimal yeast contact time) comprising the steps of constructing the base, comprising malt, with or without hops, flavor-active materials such as spices, psychoactive materials, and/or physiologically active materials; and water, combined with ultra-high temperatures, followed by cooling and the addition of yeast, under aerobic conditions. The growth of yeast produces compounds, such as esters, associated with the flavor of beer while metabolizing and/or removing aldehyde compounds. Controlling the acidity of the mixture is done by the addition of a food-grade acid. Controlling the "mouthfeel" of the product is done by boiling the malt/yeast/hops mixture (which releases peptides), and finally adding a small amount of warming agent to simulate the effect of alcohol. An example of a warming agent is isothiocyanate which can be added in synthetic form or by adding plants that contain isothiocyanate.

In one embodiment, the flavor of the product (beverage) is finished by the addition of hop oils, specialty malts, natural or artificial flavors, or any combination of fruits, herbs, spices, or vegetables to create the flavor of a desired beer or other new product. Additionally, other compounds can be added, including cannabis, terpenes, cannabinoids, cannabidiols (CBDs), synthetic cannabinoids, mushrooms, peyote and others which provide both flavor and a potential physiological or mind altering reaction.

In one embodiment, the method creates a 0.0% ABV product, which may be more desirable than a 0-0.5% ABV product. It is also possible to achieve varying levels of alcohol in the final product depending on the total contact time between the fermentable material and the yeast, combined with the length of time the mixture is held at or above the boiling point of ethanol (78.4° C.). This may aid in the evaporation of unwanted alcohol. It is also possible to add a defined amount of alcohol following the production of the 0.0% ABV product.

In one embodiment, yeast addition takes place on the "hot" side of the brewery and not the "cold" side, i.e. at approximately room temperature in the brewhouse and not in the colder, sterile fermentation cellars. Yeast type can include traditional brewer's yeast (e.g. *Saccharomyces cerevisiae* and *Saccharomyces uvarum*) but can also include other types of yeast such as baker's yeast, wine yeast, champagne yeast, distiller's yeast, and any other type of domesticated or industrial yeast and combinations thereof. Other microorganisms which are incapable of fermenting sugar can also be used, and can include *S. ludwigii, Pichia kluyveri, Zygosaccharomyces rouxii* and *Torula delbrueckii* and combinations thereof.

In one embodiment, the method creates a beer produced in 95% less time than conventional brewing methods.

In one embodiment the method creates a beer produced in 7 days, 6 days, 5 days, 4 days, 3 days, 2 days, 1 day, 12 hours, or less.

In one embodiment, the method creates a beer using 25% less space than conventional brewing methods.

In one embodiment, the method creates a beer with a 10% lower cost than conventional brewing methods.

In one embodiment, tetrahydrocannabinol (THC) is added to the beer at a concentration of 1%, 2%, 3%, 4%, 5%, 6%, 7%, 8%, 9%, 10%, 11%, 12%, 13%, 14%, or 15%.

In one embodiment, tetrahydrocannabinol (THC) can be used to infuse seltzer, with or without CBD.

In one embodiment, alcohol-free wine can be produced.

Genetically modified or classically modified yeast or other microorganisms, which possess genes and traits from other organisms, are also taught in this process.

Yeast addition is done in sterile or non-sterile conditions, since it is added in relatively large quantities, thus outcompeting other microorganisms which might be present. The mixture undergoes boiling for sterilization.

Yeast is used to decrease the flavor of aldehydes (a contributor to undesirable "worty" flavor) with adequate aeration and temperature, and not under cold, sterile, oxygen-free conditions, as is typically done in the fermentation cellars. In one embodiment, yeast, or a mixture of yeast with other microorganisms, is used to change the flavor, aroma, mouthfeel or texture of the beverage product. Yeast-produced flavor compounds include esters and terpenoids such as isoamyl acetate, phenethyl acetate, amyl acetate and citronellol, which all have boiling points above 100° C., and are therefore not boiled off (evaporated) during typical brewing and boiling procedures. These esters and flavor compounds remain in the final product to provide beer-like flavor and aroma. Additionally, when yeast is boiled, this unicellular microorganism will rupture and the amino acids and small proteins released provide a positive mouthfeel, texture and body, similar to a traditional fermented beer that contains alcohol.

The "mouthfeel" (texture or fullness) is controlled by including additional proteinaceous peptides to simulate the authentic mouthfeel of alcoholic beer.

The boiling process kills the yeast, allowing the use of any type of yeast or microorganism. In contrast, typical breweries are often opposed to bringing a foreign or wild yeast into their brewing facility, for fear of cross-contamination with the predominant yeast strain they might use. In one embodiment, the process removes the threat of contaminants of yeast strains to the brewing process.

Body and sweetness can be adjusted to emulate the body and sweetness of any beer style.

The entire process is rapid and can produce a finished product in one day, as opposed to 2 to 6 weeks for the production of a traditional, non-alcoholic malt beverage.

Alcohol can also be added to the finished product, which results in a traditional, alcohol-containing product made in a rapid time frame.

The physiological warming effect of alcohol after consumption is emulated by the use of a small amount of allyl isothiocyanate which is introduced by adding plants from the plant family Brassicaceae, such as horseradish, into the brewing mixture. In one embodiment, physiological warming effects are produced by other natural and artificial means such as the addition of natural or synthetic gingerols, shogaols, paradols or zingerone from members of the plant family Zingiberaceae, such as ginger or Grains of Paradise.

Definitions

As used herein, the term "body" refers to the fullness of the flavor of a beverage. Descriptors range from watery or characterless, to satiating or thick.

As used herein, the phrase "ultra-high" refers to mashing temperatures between 75-100° C. In one embodiment mashing temperatures range from 75–85° C. In one embodiment mashing temperatures range from 80–100° C. In one embodiment mashing temperatures range from 76–86° C. In one embodiment an ultra high temperature refers to 80° C. A mashing temperature refers to temperatures required to optimize enzymatic activity inherent to the mash and/or malt.

As used herein, the phrase "aldehyde content" refers to the amount of aldehydes present in the final product. Aldehyde content is decreased below a sensory threshold. This is a term well known in the field.

As used herein, the phrases "yeast exposure" and "yeast contact time" refer to allowing yeast cells to metabolize organic substrates.

As used herein, the term "mouthfeel" refers to the textural attributes of a beverage, those which produce a tactile sensation in the mouth.

As used herein, the phrase "simulated alcohol warming" refers to the use of various compounds to mimic the effect alcoholic beverages have on heat receptors in the human body.

As used herein, the phrase "hop oil" refers to essential oils extracted from a hop flower or cone.

As used herein, the phrase "hop solution" refers to liquid extract or dry hop powders or dry hop pellets or natural hop flowers.

As used herein, the phrase "addition of alcohol" refers to adding alcohol, powdered alcohol or a high alcohol containing liquid to the end product to create an alcoholic or low alcoholic beverage. Additionally, alcohol may be added by controlling the yeast exposure (the amount of time the yeast is producing flavors and alcohol); extended exposure times result in the production of more flavors and a small amount of alcohol. This is balanced with boiling time to minimize the evaporation and loss of alcohol.

As used herein the phrase % Real Extract (% RE) is a measure of the gravity of the beverage, where gravity refers to the amount of solids (this includes fermentable sugars) present in a mixture. RE is expressed in a weight/weight ratio, where w/w represents the content of dissolved solids in a beverage.

As used herein the phrase Dextrose Equivalent (DE) refers to the percent of mono- and di-saccharides present in a mixture and is related to the relative sweetness.

As used herein the phrase partially fermented refers to a mixture produced by yeast undergoing aerobic respiration, or minimal fermentative growth.

As used herein the phrase 0% alcohol means 0% alcohol, in one embodiment 0.0% alcohol, in one embodiment 0.00% alcohol, in one embodiment 0.01-0.49% alcohol wherein one embodiment 0% means alcohol free as determined by Alcohol and Tobacco Tax and Trade Bureau (TTB) or other government agency wherein alcohol can not be detected, while in one embodiment 0.01 to less than 0.5% is considered non-alcoholic, wherein alcohol is measured by Anton-Paar instrument or other industry standard, to measure alcohol percentage on volume to volume percentage. Alternatively this can be measured by weight to weight. Alcohol by volume is known as ABV.

As used herein the term yeast refers to a eukaryotic, single-celled microorganism classified as members of the fungus kingdom.

As used herein the term malt extract refers to sugars extracted from germinated grain.

As used herein the term mixing refers to stirring by shaking or agitating.

As used herein the term aerating refers to the addition of air by means such as mixing or the bubbling of air or oxygen through the mixture.

As used herein the term maltodextrin refers to a water soluble powder or liquid with a neutral taste produced from vegetable starch, including but not limited to, rice, corn, wheat or tapioca.

As used herein the term mineral supplement refers to minerals including but not limited to salts and electrolytes.

As used herein the term deg P refers to a measurement used to quantify the concentration of extract (mainly sugars derived from malt but also including other soluble material in wort) as a percentage by weight. Also commonly referred to as Degrees Plato.

As used herein, the term "seltzer" refers to carbonated water.

EMBODIMENTS

One method is described for producing a beer-like malt beverage containing 0% alcohol by volume, comprising the steps of constructing the malt base, with or without hops, flavor-active materials such as spices, psychoactive materials, and/or physiologically active materials; with partial fermentation, by yeast (with minimal contact time) and controlling the body and sweetness of the malt base by blending malt extract and maltodextrin. Step 1 consists of blending a mixture of malt extract (dry or liquid) with or without hops, flavor-active materials such as spices, psychoactive materials, and/or physiologically active materials; with water and yeast. This is stirred, and aerated for 4 hours (range of 0.01 to 5 hours, up to 2 weeks) at 31° C. (range of 0 to 35° C., up to 75° C.). Step 2 consists of the addition of maltodextrin, water, lactic acid and hop solution to achieve the desired % RE for the malt extract and maltodextrin. The total weight amount of malt extract plus maltodextrin is calculated based on the % Real Extract of the alcoholic beer that is to be emulated. Typical beers have a finished % RE between 0.5-10% w/w, where w/w represents the content of dissolved solids in a beer. For example, an 8% w/w RE would require 8 grams of malt extract plus maltodextrin in a liquid product weighing 100 grams. Light beers have 0.5-2% w/w RE. Lagers and wheat-type beers have 3-6% w/w RE. Non-alcoholic or alcohol free wheat-type beers target 5.4% w/w RE. India Pale Ales (IPAs) and heavier beers have 4-8% w/w RE. Non-alcoholic or alcohol free IPAs target 7.5% w/w RE. By targeting these RE amounts, the body of the desired beer can be re-created with a mixture of malt extract and maltodextrin.

In one embodiment described, RE is controlled in an all-malt brewing process using ultra-high mashing temperatures of 75-85° C. and up to 100° C. In one embodiment, brewer's mash mixture contains water, with or without hops, flavor-active materials such as spices, psychoactive materials, and/or physiologically active materials; and malted barley. In one embodiment additionally it contains malted or unmalted wheat (20-60%), oats (1-10%), rice (10-60%), corn (10-60%), rye (1-5%), triticale (5-20%) or any other grain including so called "ancient" grains such as amaranth, quinoa, sorghum, teff, and spelt. In one embodiment ancient grains are added from 1-50%. All additions are added as a weight percent of the total mash weight. In one embodiment starch is added in combination with a dextrinous material (unfermentable, long-chain sugars). During the mash process, the mash mixture is heated to temperatures over 75° C. prior to boiling. In one embodiment temperatures during the mash process range from 75 to 100° C. In one embodiment 80° C. is used for production of RE with low fermentability and optimal body. In one embodiment the mash mixture is heated for 20 minutes. In one embodiment the mash mixture is heated for 15 to 20 minutes. In one embodiment the mash mixture is heated for 20 to 25 minutes. In one embodiment the mash mixture is heated for 25 to 30 minutes. In one embodiment the mash mixture is heated for 30 to 35 minutes. In one embodiment the mash mixture is heated for 35 to 40 minutes.

Sweetness of the final product is controlled by the ratio of malt extract (with or without other simple sugars) to maltodextrin, or other dextrinous ingredients, in order to target a specific Dextrose Equivalent (DE). DE refers to the percent of mono- and di-saccharides present and is related to the relative sweetness. Malt extract has a high level of simple sugars with a high relative sweetness (i.e. high DE). Conversely, maltodextrin has a low level of simple sugars with a low relative sweetness (i.e. not sweet). Any ratio of malt extract to maltodextrin can be used. In one embodiment a light (beer) beverage has a ratio of about 0.5-2% w/w RE to about 0.5-2% w/w DE. In one embodiment an IPA style (beer) beverage has a ratio of about 4-8% w/w RE to about 3-6% w/w DE. In one embodiment a wheat style (beer) beverage has a ratio of about 3-6% w/w RE to about 2-4% w/w DE.

In one embodiment, the method comprises decreasing aldehydes by yeast exposure. Unfermented beer (also called "wort") has high amounts of flavor-active compounds, called aldehydes, which result in negative flavors if present in non-alcoholic beers. Aldehydes are present in the malt extract fraction with or without hops, flavor-active materials such as spices, psychoactive materials, and/or physiologically active materials; and not in the maltodextrin fraction with or without hops, flavor-active materials such as spices, psychoactive materials, and/or physiologically active materials. In one embodiment only the malt fraction with or without hops, flavor-active materials such as spices, psychoactive materials, and/or physiologically active materials; of the base is mixed with yeast and water and held at room temperature (range of 0-35° C., up to 75° C.) for 0.01-5 hours, up to 2 weeks, to decrease the aldehydes below their flavor threshold. In one embodiment the malt fraction of the base, with or without hops, flavor-active materials such as spices, psychoactive materials, and/or physiologically active materials, is mixed with yeast and water and held at room temperature (range of 0-35° C., as high as 75° C.) for 3-4 hours. In one embodiment the malt fraction of the base (with or without hops, flavor-active materials such as spices, psychoactive materials, and/or physiologically active materials) is mixed with yeast and water and held at room temperature (range of 0-35° C., as high as 75° C.) for 2-4 hours. In one embodiment the malt fraction of the base (with or without hops, flavor-active materials such as spices, psychoactive materials, and/or physiologically active materials) is mixed with yeast and water and held at room temperature (range of 0-35° C., as high as 75° C.) for 4 hours. In one embodiment a maltodextrin, or other dextrinous ingredients, fraction is added in this step. This mixture includes brewer's yeast and is held at a temperature range of 0-35° C., as high as 75° C. In one embodiment the temperature range is from 28-35° C. In one embodiment the temperature range is from 31-32° C. In one embodiment, non-brewing yeast strains are used at temperatures exceeding 35° C. In one embodiment additional yeast strains include, but are not limited to baker's yeast, wine yeast, champagne yeast, distiller's yeast, and any other type of domesticated or industrial yeast. In one embodiment additional microorganisms which are incapable of fermenting certain sugars are used, and can include *Saccharomycodes ludwigii, Pichia kluyveri, Zygosaccharomyces rouxii* and *Torula delbrueckii*.

In one embodiment genetically modified or classically modified yeast or other microorganisms, which possess genes and traits from other organisms, are used.

In one embodiment, other microorganisms are used which work to decrease the negative flavor compounds in the wort mixture.

In one embodiment in order to decrease or eliminate negative flavors, the presence of yeast or other microorganisms results in the production of flavor-positive components such as esters and higher alcohols (alcohols with more than two carbon atoms). Many of these flavor-positive components have boiling points higher than 100° C., which is the temperature at which traditional brewhouse boiling occurs, and thus will survive the boiling step and be present in the finished product. These flavor-positive components add to the finished, beer flavor of the final product. Constant stirring provides aeration and oxygen so that the yeast are active and will grow anaerobically or aerobically, therefore minimizing alcohol production during this time. Growth of the yeast additionally produces flavor-positive compounds and prevents production of aldehydes. Aeration can also be achieved by other means such as bubbling of air or oxygen through the mixture. In one embodiment, solutions rich in unsaturated fatty acids, such as unsaturated vegetable oil, are used to provide nourishment to the yeast or other microorganisms. Sterility is not required since this mixture will be boiled; conditions may also use sterile techniques. After the holding time, the malt fraction (with or without hops, flavor-active materials such as spices, psychoactive materials, and/or physiologically active materials) with yeast is added to the previously prepared maltodextrin solution described above, at the appropriate RE concentration and the mixture is boiled for 0.1 minute or more to deactivate the yeast, boil off (evaporate) and remove any alcohol that might be produced, and to sterilize the solution. In one embodiment, the boiling step is controlled to produce a desired amount of alcohol in the range of 0% to more than 0.49%, depending on the desired final level of alcohol in the product. In one embodiment a low alcohol beer product, defined by The Alcohol and Tobacco Tax and Trade Bureau (TTB) as having 0.5-2.5% ABV, is made with this process. In one embodiment allows a brewer to demonstrate, if needed, that alcoholic fermentation may be allowed to occur in those instances where a demonstrated production of alcohol must take place in order for a product to be called a "beer", or for a product to fall under the jurisdiction of one government agency (e.g. Food and Drug Administration) or another (e.g. TTB) in terms of required product labeling.

In one embodiment the pH of the extract is controlled. Lactic acid or any other food-grade acid, such as citric acid, phosphoric acid or an acidic preparation using acid-producing bacteria such as *Lactobacillus delbrückii, L. brevis, L. acidophilus, L. lactis, Pediococcus damnosus* (formerly called *P. cerevisiae*, and now classified as *P. acidilactici*), acidified malt or other acidified ingredients or materials, is used to decrease the pH to that of a finished beer, which ranges from about pH 3.0 to 6.5.

In one embodiment the "mouthfeel" is controlled by the addition of proteinaceous peptides. Mouthfeel is defined as a textural attribute of beer. This is controlled by boiling the yeast and malt mixture to kill and lyse the yeast cells, releasing yeast oligopeptides and polypeptides and thereby improving the mouthfeel of the product. Peptides can consist of oligopeptides (two to twenty amino acids in length) and polypeptides up to about 50 amino acids. Peptides larger than about 50 amino acids are known as proteins and generally do not survive the boiling step of the brewing process. In one embodiment peptides are added by the breakdown of larger proteins, either naturally, chemically or enzymatically.

In one embodiment preparations of fermented products are added to enrich the final non-alcoholic beer product with proteinaceous peptides. In one embodiment these products include soy sauce (fermented wheat or soy) which uses a mold such as *Aspergillus* spp. to ferment, or bacteria such as *Lactobacillus* spp. to break down existing sugars into lactic acid. Typical use ranges from 0.1 to 50 or more milliliters fermented product per liter, to impart mouthfeel. In one embodiment the usage in non-alcoholic (beer) beverage is 1-5 mL per liter, while the preferred usage is 3 mL per liter. In one embodiment the usage in low-alcoholic (beer) beverage is 1-5 mL per liter, in one embodiment usage is 3 mL per liter. In one embodiment proteinaceous peptides from fermented products Miso, tauco, and kombucha are added.

In one embodiment to emulate the "heat" of alcohol a small amount of allyl isothiocyanate is added to the mixture. This can be introduced by adding synthetic or isolated allyl isothiocyanate, or by adding small amounts of plant material containing this compound. In one embodiment plants from the plant family Brassicaceae, classically referred to as Cruciferae, (mustard family) include horseradish, mustard seed, turnips, rutabaga, cabbage, kohlrabi, Brussel sprouts, cauliflower, broccoli and kale are added. Foods made from these plants, such as wasabi (made from horseradish and mustard seed), are used. Ranges from 0.1 to 1000 micrograms or more per liter can be used to induce heat reaction similar to that of alcohol warming. In one embodiment about 100 micrograms per liter are added to provide a mild warming effect similar to alcohol. Plants or foods are added to the mash mixture at any point after boiling to achieve the desired level of warming. As allyl isothiocyanate has a boiling point of 151° C., it will remain in solution and the boiling of the wort at 100° C. will not vaporize it. The temporary heat from allyl isothiocyanate is different than the burning, lingering heat of capsaicin from chili peppers. Warming effects can also be emulated by other natural and artificial means such as the addition of gingerols, shogaols, paradols or zingerone from members of the plant family Zingiberaceae, such as ginger or Grains of Paradise.

In one embodiment to create an IPA, appropriate hop oil or extracts are added for bitterness and other flavoring. Hop oil and extracts may be very concentrated and as little as 0.01 microgram or more than 100 mg per liter may be used depending on the original concentration of the oil or extract. In one embodiment the product is dry-hopped with hop material such as hop pellets, using as little as 0.01 gram per liter to more than 1000 grams per liter. In one embodiment specialty malts are added to emulate desired beer styles. These can be added as concentrated extracts or as milled malt. Additions may be as low as 0.01 gram per liter to more than 1000 grams per liter. Wheat malts may be added for wheat beer flavor. In one embodiment roasted malts are added for the flavors associated with stout beers. In one embodiment caramel malts are added for flavors associated with amber ales, and the like. In one embodiment natural and artificial flavors are added to the finished product to create other desired beer styles and new products, such as seltzers or kombuchas. In one embodiment ingredients such as herbs, spices, teas, caffeine, vitamin and mineral supplements, melatonin, juices, *cannabis*, terpenes, cannabinoids, cannabidiols, synthetic cannabinoids, mushrooms, psilocybin containing mushrooms, peyote, ayahuasca, mescaline and other items which provide flavoring or physiological and mind altering reactions are added to the finished product. In one embodiment the finished product is carbonated to desired levels, packaged and pasteurized. In one embodiment carbonation ranges from a natural level of about 1.5 vol/vol $CO_2$ to very high levels above 3.0 vol/vol $CO_2$.

In one embodiment the carbonation method is either natural carbonation or forced carbonation. Natural carbonation occurs during the short amount of time the yeast is allowed to ferment. Forced carbonation can be used to achieve a target level of 2.7, with a range between 1.5 vol/vol to 3.0 vol/vol or higher.

In one embodiment, non-alcoholic products made by the described process are made into alcoholic products by the addition of alcohol. This is achieved by adding any product containing alcohol, or a high-alcohol containing product that was fermented (such as a high alcohol beer or wine), or a powdered alcohol product. Products made in this way resemble traditionally made products such as beer, wine, kombucha, hard seltzer, and the like. This process allows for the production of an alcoholic beverage in a rapid time frame—typically less than 12 hours, compared to the traditional time frame of 2 to 6 weeks or more, resulting in significant savings in cost, labor and materials.

One general aspect includes a method for producing a beverage. The method also includes mixing malt extract, with or without hops, flavor-active materials such as spices, psychoactive materials, and/or physiologically active materials; water and yeast; aerating the mixture for 0.01-5 hours, up to 2 weeks at 31° C. (range of 30-35° C., as high as 75° C.); adding the mixture to maltodextrin, water, lactic acid and hop solution; heating to temperatures to boiling; and then cooling.

Implementations may include one or more of the following features. The method where the beverage contains 0% alcohol. The amount of malt extract and maltodextrin are adjusted to change the body and sweetness of said beverage. Following the addition of maltodextrin, other ingredients may include hops, spices, herbs, specialty malts or combinations thereof are added. The alcohol content is assessed prior to heating, or after heating or both. The aldehyde content and/or flavor-positive components of said beverage are controlled by allowing partial fermentation (with minimal yeast contact time) by yeast during production. The mouthfeel of said beverage is controlled by the addition of proteinaceous peptides. Following maltodextrin addition, adding a material selected from the group may include allyl isothiocyanate, gingerols, shogaols, paradols and zingerone. The flavor of said beverage is altered by the addition of a material selected from the group may include of hop oil, hop extract, specialty malt, natural flavor, artificial flavor and combinations thereof. The flavor of said beverage is altered by the addition of a material selected from the group may include of caffeine, vitamin supplements, mineral supplements, kombucha, herbs, teas, spices, beer, wine, spirits, terpenes, cannabinoids, synthetic cannabinoids, mushrooms, psilocybin containing mushrooms, peyote, ayahuasca, mescaline and combinations thereof. The addition provides flavor and/or physiological and/or mind-altering reactions. Alcohol is added to the malt beverage to create alcoholic beer, wine or spirits in a time frame that is more rapid than traditional methods or fermentation. A method for producing a beverage may include: mixing malt, with or without hops, flavor-active materials such as spices, psychoactive materials, and/or physiologically active materials, and water; heating to at least 75° C. for at least 20 minutes; cooling to 32° C.; adding yeast, with or without hops, flavor-active materials such as spices, psychoactive materials, and/or physiologically active materials; aerating and controlling the temperature to not more than 32° C. (range of 0-32° C.) for at least 3 hours; heating to boiling, and then cooling. The beverage contains 0% alcohol. The first heating steps are adjusted for time and temperature to change the body and sweetness of said beverage. Following the first heating step, other ingredients may include of hops, spices, herbs, specialty malts or combinations thereof are added. The alcohol content is assessed prior to heating, or after heating or both. The aldehyde content and/or flavor-positive components of said beverage are controlled by allowing partial fermentation (with minimal yeast contact time) by yeast during production. The mouthfeel of said beverage is controlled by the addition of proteinaceous peptides. Following the first heating step, adding a material selected from the group may include of allyl isothiocyanate, gingerols, shogaols, paradols and zingerone. The flavor of said beverage is altered by the addition of a material selected from the group may include of hop oil, hop extract, specialty malt, natural flavor, artificial flavor and combinations thereof. The flavor of said beverage is altered by the addition of a material selected from the group may include of caffeine, vitamin supplements, mineral supplements, kombucha, herbs, teas, spices, beer, wine, spirits, terpenes, cannabinoids, synthetic cannabinoids, mushrooms, psilocybin containing mushrooms, peyote, ayahuasca, mescaline and combinations thereof. The addition provides flavor and/or physiological and/or mind-altering reactions.

EXAMPLES

Example 1

Ultra-High Temperature Mashing

Belgian Style White Per-Bbl Brew

| Ingredient | QTY | |
|---|---|---|
| Malt | 15-25 | lbs |
| Wheat | 10-20 | lbs |
| Oats | 1-10 | lbs |
| Lactic Acid, 88% | 50-100 | ml |
| Brewer's Yeast | 15-30 | gm |
| Hops | 50-200 | gm |
| Orange Peel | 200-1000 | gm/bbl |
| Coriander | 100-500 | gm/bbl |

Mash with 40 gallons 80° C. water; Hold at 80° C. for 30 minutes.
Lauter to brewkettle and sparge grains with 80° C. water
Cool to 31° C.
Add yeast with or without hops, flavor-active materials such as spices, psychoactive materials, and/or physiologically active materials; and aerate and mix for 4 hours at 31° C.
Add lactic acid
Add hops
Increase temperature to boil; Boil 60 minutes
Add hops, orange peel and coriander
Whirlpool or filter to clarify, if desired
Transfer to tank at 4° C.; should be 5.0-6.0 deg P and pH 4.15-4.35
Filter, carbonate and package

Example 2

Malt Extract Mashing

Belgian Style White Per-Bbl Brew

| Ingredient | QTY | |
|---|---|---|
| Malt Extract | 1-5 | lbs |
| Wheat Extract | 1-5 | lbs |
| Oats | 0.5-5 | lbs |
| Lactic Acid, 88% | 50-100 | ml |
| Brewers Yeast | 15-30 | gm |
| Hops | 50-200 | gm |
| Orange Peel | 200-1000 | gm/bbl |
| Coriander | 100-500 | gm/bbl |

Mix malt extract, with or without hops, flavor-active materials such as spices, psychoactive materials, and/or physiologically active materials; and malt extracts with 40 gallons 31° C. water
Add yeast and aerate and mix for 4 hours at 31° C.
Add lactic acid
Add hops
Increase temperature to boil; Boil 60 minutes
Add hops, orange peel and coriander
Whirlpool or filter to clarify, if desired
Transfer to tank at 4° C.; should be 5.0-6.0 deg P and pH 4.15-4.35
Filter, carbonate and package

Example 3

Ultra-High Temperature Mashing

IPA Per-Bbl Brew

| Ingredient | QTY | |
|---|---|---|
| Malt | 25-35 | lbs |
| Lactic Acid, 88% | 50-100 | ml |
| Brewers Yeast | 15-30 | gm |
| Hops | 100-300 | gm |
| Dry hop | 500-1000 | gm/bbl |

Mash with 40 gallons 80° C. water; Hold at 80° C. for 30 minutes.
Lauter to brewkettle and sparge grains with 80° C. water
Cool to 31° C.
Add yeast, with or without hops, flavor-active materials such as spices, psychoactive materials, and/or physiologically active materials; and aerate and mix for 4 hours at 31° C.
Add lactic acid
Add hops
Increase temperature to boil; Boil 60 minutes
Add hops
Whirlpool or filter to clarify
Transfer to tank at 4° C.; should be 6.5-7 deg P and pH 4.15-4.35
Dry hop
Filter, carbonate and package

Example 4

Malt Extract Mashing

IPA Per-Bbl Brew

| Ingredient | QTY | |
|---|---|---|
| Malt Extract | 2-15 | lbs |
| Lactic Acid, 88% | 50-100 | ml |
| Brewers Yeast | 15-30 | gm |
| Hops | 100-300 | gm |
| Dry hop | 500-1000 | gm/bbl |

Mix malt extract, with or without hops, flavor-active materials such as spices, psychoactive materials, and/or physiologically active materials, with 40 gallons 31° C. water Add yeast and aerate and mix for 4 hours at 31° C.
Add lactic acid
Add hops
Increase temperature to boil; Boil 60 minutes
Add hops
Whirlpool or filter to clarify
Transfer to tank at 4° C.; should be 6.5-7 deg P and pH 4.15-4.35
Dry hop
Filter, carbonate and package It will be apparent to those skilled in the art that various modifications and variations can be made in the methods and compositions of the present invention without departing from the spirit or scope of the invention.

What is claimed is:

1. A method for producing a beverage comprising:
   a. Mixing malt extract, with or without hops, flavor-active materials including spices, psychoactive materials, and/or physiologically active materials; water and yeast;
   b. Aerating the mixture for 0.01 to 5 hours or up to 2 weeks at 32° C. (range of 30-35° C., up to 75° C.);
   c. Adding the mixture to maltodextrin, water, lactic acid and hop solution;
   d. heating temperatures to boiling; and then
   e. cooling.

2. The method according to claim 1, wherein the beverage contains 0.0% alcohol.

3. The method according to claim 1, wherein the amount of malt extract and maltodextrin are adjusted to change the body and sweetness of said beverage.

4. The method according to claim 1, wherein following the addition of maltodextrin, other ingredients consisting of hops, spices, herbs, specialty malts or combinations thereof are added.

5. The method according to claim 1 wherein, the aldehyde content and/or flavor-positive components of said beverage are controlled by allowing partial fermentation by yeast during production.

6. The method according to claim 1, wherein the mouthfeel of said beverage is controlled by the addition of proteinaceous peptides.

7. The method according to claim 1, wherein following maltodextrin addition, adding a material selected from the group consisting of allyl isothiocyanate, gingerols, shogaols, paradols and zingerone.

8. The method according to claim 1, wherein the flavor of said beverage is altered by the addition of a material selected from the group consisting of hop oil, hop extract, specialty malt, natural flavor, artifical flavor and combinations thereof.

9. The method according to claim 1, wherein the flavor of said beverage is altered by the addition of a material selected from the group consisting of caffeine, vitamin supplements, mineral supplements, kombucha, herbs, teas, spices, beer, wine, spirits, terpenes, cannabinoids, synthetic cannabinoids, mushrooms, psilocybin containing mushrooms, peyote, ayahuasca, mescaline and combinations thereof.

10. The method according to claim 1, wherein alcohol is added to the malt beverage to create alcoholic beer, wine or spirits in a time frame that is more rapid than traditional methods of fermentation.

11. A method for producing a beverage comprising:
    a. Mixing malt, with or without hops, flavor-active materials including spices, psychoactive materials, and/or physiologically active materials, and water;
    b. Heating to at least 75° C. for at least 20 minutes, then cooling;
    c. Adding yeast, with or without hops, flavor-active materials including spices, psychoactive materials, and/or physiologically active materials;
    d. Aerating and controlling temperature to at least 32° C.;
    e. heating to boiling; and then
    f. cooling.

12. The method according to claim 11, wherein the beverage contains 0.0% alcohol.

13. The method according to claim 11, wherein the first heating step are adjusted for time and temperature to change the body and sweetness of said beverage.

14. The method according to claim 11, wherein following the first heating step, other ingredients consisting of hops, spices, herbs, specialty malts or combinations thereof are added.

15. The method according to claim 11 wherein, the aldehyde content and/or flavor-positive components of said beverage are controlled by allowing partial fermentation by yeast during production.

16. The method according to claim 11, wherein the mouthfeel of said beverage is controlled by the addition of proteinaceous peptides.

17. The method according to claim 11, wherein following the first heating step, adding a material selected from the group consisting of allyl isothiocyanate, gingerols, shogaols, paradols and zingerone.

18. The method according to claim 11, wherein the flavor of said beverage is altered by the addition of a material selected from the group consisting of hop oil, hop extract, specialty malt, natural flavor, artifical flavor and combinations thereof.

19. The method according to claim 11, wherein the flavor of said beverage is altered by the addition of a material selected from the group consisting of caffeine, vitamin supplements, mineral supplements, kombucha, herbs, teas, spices, beer, wine, spirits, terpenes, cannabinoids, synthetic cannabinoids, mushrooms, psilocybin containing mushrooms, peyote, ayahuasca, mescaline and combinations thereof.

20. The method according to claim 11, wherein alcohol is added to the malt beverage to create alcoholic beer, wine or spirits in a time frame that is more rapid than traditional methods of fermentation.

\* \* \* \* \*